United States Patent [19]

Schildkraut et al.

[11] Patent Number: 4,971,426

[45] Date of Patent: Nov. 20, 1990

[54] OPTICAL ARTICLE FOR REFLECTION MODULATION

[75] Inventors: Jay S. Schildkraut; Christopher B. Rider; Michael Scozzafava, all of Rochester, N.Y.

[73] Assignee: Eastman Kodak Company, Rochester, N.Y.

[21] Appl. No.: 419,817

[22] Filed: Oct. 11, 1989

[51] Int. Cl.$^5$ .......................... G02F 1/035; G02F 1/35
[52] U.S. Cl. ....................................... 350/385; 252/585; 307/430; 350/96.14; 350/96.34; 350/390
[58] Field of Search ................. 252/585; 307/424, 430; 350/96.12, 96.13, 96.14, 96.15, 96.17, 96.19, 96.34, 384, 385, 386, 321, 390

[56] References Cited

U.S. PATENT DOCUMENTS

| | | |
|---|---|---|
| 2,441,668 | 5/1948 | Mathers et al. |
| 3,176,575 | 4/1965 | Socha |
| 3,883,214 | 3/1975 | Hoffman |
| 4,249,796 | 2/1981 | Sinoerbox et al. ............... 350/370 |
| 4,451,123 | 5/1984 | McNeill et al. .................. 350/386 |
| 4,792,298 | 12/1988 | Ulman et al. ................... 350/96.34 |
| 4,796,971 | 1/1989 | Robello et al. .................. 350/96.34 |

OTHER PUBLICATIONS

D. J. Williams, "Organic Polymeric and Non-Polymeric Materials with Large Optical Nonlinearities", *Angew. Chem.* Int. Ed. Engl. 23 (1984) 690-703.
Zyss "Nonlinear Organic Materials for Integrated Optics", *Journal of Molecular Electronics*, vol. 1, pp. 25-45, 1985.
Sarid, "Long-Range Surface-Plasmon Waves on Very Thin Metal Films", Phys. Rev. Lett., vol. 47, No. 26, Dec. 1981, pp. 1927-1930.
Persegol et al., "A Novel Type of Light Moduator", SPIE vol. 864, Advanced Optoelectronic Technology (1987) pp. 42-44.
Schildkraut, "Long Range Surface Plasmon Electrooptic Modulator", Applied Optics, vol. 27, No. 21, Nov. 1, 1988, pp. 4587-4590.

*Primary Examiner*—Bruce Y. Arnold
*Assistant Examiner*—Martin Lerner
*Attorney, Agent, or Firm*—Carl O. Thomas

[57] ABSTRACT

An optical article is disclosed capable of modulating the reflection of electromagnetic radiation containing a reflective metal layer having a thickness of less than 0.5 $\mu$m, an optical coupler for directing polarized electromagnetic radiation to the reflective metal layer and serving as a support for the device, a first dielectric layer interposed between the reflective metal layer and the support having a thickness in the range of from 0.1 to 10 times the wavelength of the electromagnetic radiation, a second dielectric layer adjacent the reflective metal layer exhibiting a refractive index which differs from that of the first dielectric layer by less than 20 percent and can adjusted by an applied electrical potential gradient, and means for variably applying an electrical potential to a surface of the second dielectric layer remote from the reflective metal layer. The second dielectric layer is a polymeric layer coated on the reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety.

26 Claims, 2 Drawing Sheets

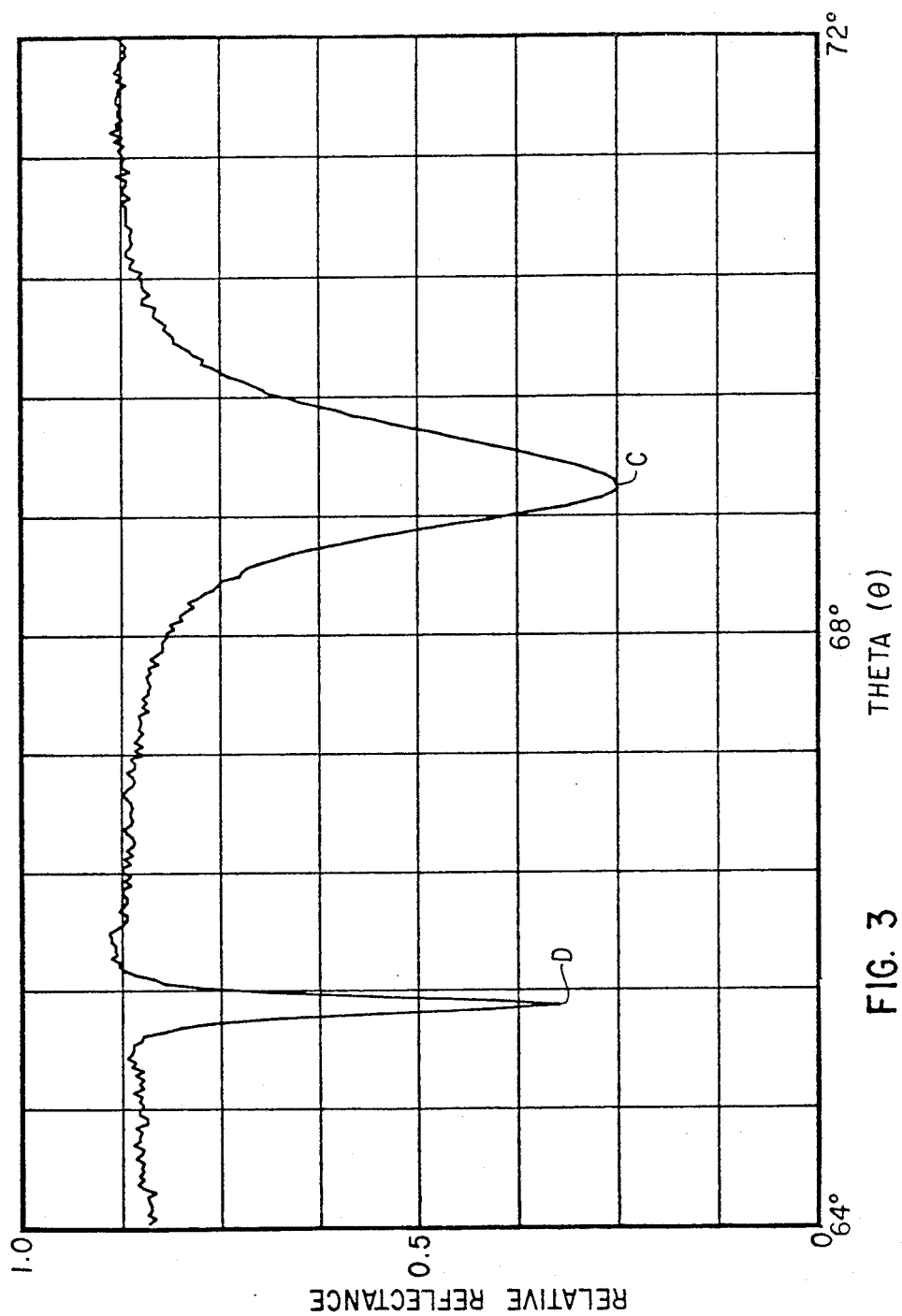

OPTICAL ARTICLE FOR REFLECTION MODULATION

FIELD OF THE INVENTION

The invention relates to optical articles for the nonlinear propagation of electromagnetic radiation.

BACKGROUND OF THE INVENTION

Nonlinear optics is concerned with the interactions of electromagnetic fields in various media to produce new fields altered in phase, frequency, amplitude, or other propagation characteristics from the incident fields. In order to gain an insight into the origin of nonlinear optical effects, the polarization P induced in a molecule by a local electric field E can be expressed by Equation 1

$$P = \alpha E + \beta E^2 + \gamma E^3 \quad (1)$$

where
  P is the total induced polarization,
  E is the local electric field created by electromagnetic radiation, and
  $\alpha$, $\beta$, and $\gamma$ are the first, second and third order polarizabilities, each of which is a function of molecular properties.

The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \quad (2)$$

where
  P is the total induced polarization,
  E is the local electric field created by electromagnetic radiation, and
  $\chi^{(1)}$, $\chi^{(2)}$, and $\chi^{(3)}$ are the first, second, and third order polarization susceptibilities of the electromagnetic wave transmission medium.

The macromolecular level terms of Equation 2 are first order $\chi^{(1)} E$, second order polarization $\chi^{(2)}$, and third order polarization $\chi^3 E^3$.

D. J. Williams, "Organic Polymeric and Non-Polymeric Materials with Large Optical Nonlinearities", *Angew. Chem.* Int. Ed. Engl. 23 (1984) 690–703, and Zyss "Nonlinear Organic Materials for Integrated Optics", *Journal of Molecular Electronics*, vol. 1, pp. 25–45, 1985, disclose a variety of nonlinear optical end uses that can be served by utilizing $\chi^{(2)}$ or $\chi^{(3)}$ properties of a propagation medium.

Interest in nonlinear optical devices has particularly centered on devices relying on second order polarization susceptibilities. To achieve on a macromolecular level second order polarization ($\chi^{(2)} E^2$) of any significant magnitude, it is essential that the transmission medium exhibit high (herein employed to mean greater than $10^{-9}$ electrostatic units) second order polarization susceptibilities. To realize such values of $\chi^{(2)}$ it is necessary that the second polarizability $\beta$ be greater than $10^{-30}$ electrostatic units (esu).

A significant difficulty encountered in finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center—that is, non centrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular are placed in an electric field.

For a number of years the materials employed for achieving second order polarization effects were non-centrosymmetric inorganic crystals, such as potassium dihydrogen phosphate and lithium niobate. Williams postulates mathematically and experimentally corroborates second order polarization susceptibilities in organic molecular dipoles equalling and exceeding those of conventional inorganic dipoles.

A technique that has been found useful in obtaining high $\chi^{(2)}$ organic molecular dipole layers for nonlinear propagation of electromagnetic radiation is to incorporate the organic dipoles in a polymeric medium having a glass transition well above ambient temperatures. The organic molecular dipoles can form a part of the polymer molecule or simply be blended with the polymer. While the polymeric medium is heated above its glass transition temperature, an electric field gradient is placed across the medium. The organic molecular dipoles align themselves with the electric field gradient. With the electric field applied the polymeric medium is cooled to below its glass transition temperature, thereby locking the organic dipoles in a polar aligned, non-centrosymmetric arrangement essential to achieving high $\chi^{(2)}$ values. The technique is commonly referred to as poling, and high $\chi^{(2)}$ layers so generated are commonly referred to as poled polymeric layers. Ulman et al U.S. Pat. No. 4,792,208 and Robello et al U.S. Pat. No. 4,796,971 are cited as illustrative of a number of patents disclosing poled polymeric media.

Metal fluorides and oxides have been employed with optical articles, such as lenses Mathers et al U.S. Pat. No. 2,441,668; Socha U.S. Pat. No. 3,176,575; and Hoffman U.S. Pat. No. 3,883,214 are illustrative.

An art recognized class of nonlinear optical articles are those that modulate reflection, either for the purpose of controlling its intensity or polarization. Devices intended for this purpose, commonly referred to as attenuated total reflection devices or ATR's, are illustrated by ATR-1: Sincerbox et al U.S. Pat. No. 4,249,796;
ATR-2: McNeill et al U.S. Pat. No. 4,451,123;
ATR-3: Sarid, "Long Range Surface-Plasmon Waves on Very Thin Metal Films", Phys. Rev. Lett., Vol. 47, No. 26, Dec. 1981, pp. 1927–1930;
ATR-4: Persegol et al., "A Novel Type of Light Moduator", SPIE Vol. 864, Advanced Optoelectronic Technology (1987) pp. 42–44;
ATR-5: Schildkraut, "Long Range Surface Plasmon Electrooptic Modulator", Applied Optics, Vol. 27, No. 21, Nov. 1, 1988, pp. 4587–4590.

RELATED PATENT APPLICATIONS

Brazas et al U.S. Ser. No. 273,785, filed Nov. 21, 1988, commonly assigned, discloses depositing on a support an optical conduction layer of a low molecular weight organic compound having a glass transition temperature above about 50° C. In one form an overlying portion of the layer has a differing refractive index than the underlying portion and is patterned to form an optical element.

Scozzafava et al NONLINEAR OPTICAL ARTICLE WITH IMPROVED BUFFER LAYER U.S. Ser. No. 419,819, concurrently filed and now allowed, commonly assigned, and a metal fluoride or oxide.

Rider et al NONLINEAR OPTICAL ARTICLE FOR MODULATING POLARIZED LIGHT U.S. Ser. No. 419,984, concurrently filed and now allowed, commonly assigned, discloses the use of metal fluoride and oxide layers of thicknesses of less than 0.1 $\mu$m between a conductive layer containing a moderate work function metal and a poled polymeric medium having a glass transition temperature of at least 50° C.

Scozzafava et al NONLINEAR OPTICAL WAVEGUIDE DEVICE U.S. Ser. No. 419,819, concurrently filed and now allowed, commonly assigned, discloses an optical article with a high $\chi^{(2)}$ poled polymeric medium formed on a buffer layer and comprised of low molecular weight aromatic compound.

SUMMARY OF THE INVENTION

Although ATR's have been theoretically explored and actually-constructed, few, if any, practically attractive ATR constructions have been reported. Construction difficulties have been particularly encountered in attempting to prepare ATR's of the type disclosed in ATR-3, ATR-4, and ATR-5, cited above, which require a dielectric medium to be interposed between the reflective metal layer and the optical coupling element. A common solution has been to form the reflective metal layer on a separate support and to optically couple to this layer by using an optical coupling fluid to achieve contact with the prism or other optical coupling element employed While such an element is entirely satisfactory for theoretical investigations, multiple supports and fluid layers present significant obstacles to find practical uses for these ATR devices.

The present invention is directed to an ATR construction that allows (1) two dielectric layers to be located on opposite sides of a reflective metal layer for maximum modulation efficiency, (2) for ease of fabrication a polymeric layer to be employed as the layer having nonlinear optical properties, this layer additionally having distinct frequency of response advantages over liquid crystals by reason of containing aligned molecular dipoles having an electron donor moiety linked through a conjugated $\pi$ bonding system to an electron acceptor moiety, and (3) a unitary sequence of solid layers on a single support for a convenient practical construction.

In one aspect, this invention is directed to an optical article capable of modulating the reflection of electromagnetic radiation comprised of a reflective metal layer having a thickness of less than 0.5 $\mu$m, means for directing polarized electromagnetic radiation to the reflective metal layer, a first dielectric medium interposed between the reflective metal layer and the support having a thickness in the range of from 1 to 10 times the wavelength of the electromagnetic radiation, a second dielectric medium adjacent the reflective metal layer exhibiting a refractive index which differs from that of the first dielectric medium by less than 20 percent and can be adjusted by an applied electrical potential gradient, and means for variably applying an electrical potential to a surface of the second dielectric medium remote from the reflective metal layer.

The optical article is characterized in that the means for directing the electromagnetic radiation constitutes a support, the first dielectric medium is a first dielectric layer coated on the support comprised of at least one metal oxide, metal fluoride, or low molecular weight aromatic compound, the reflective metal layer is coated on the first dielectric layer, and the second dielectric medium is a polymeric layer coated on the reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety.

BRIEF DESCRIPTION OF THE DRAWINGS

FIG. 3 is a plot of relative reflectance versus the angle of incidence ($\Theta$).

DESCRIPTION OF PREFERRED EMBODIMENTS

The invention is applicable to the propagation of electromagnetic radiation in the wavelength ranges commonly encountered by nonlinear optical articles—e.g., wavelengths ranging from the near ultraviolet, typically 300 to 400 nm, through the visible of 400 to 700 nm and well into the infrared up to wavelengths of 2.0 $\mu$m or more. The optical articles of the invention are particularly useful with solid state lasers providing input wavelengths in the range from about to 1500 nm. Second harmonic wavelengths internally generated are, of course, half the input radiation wavelengths.

Figure 1:
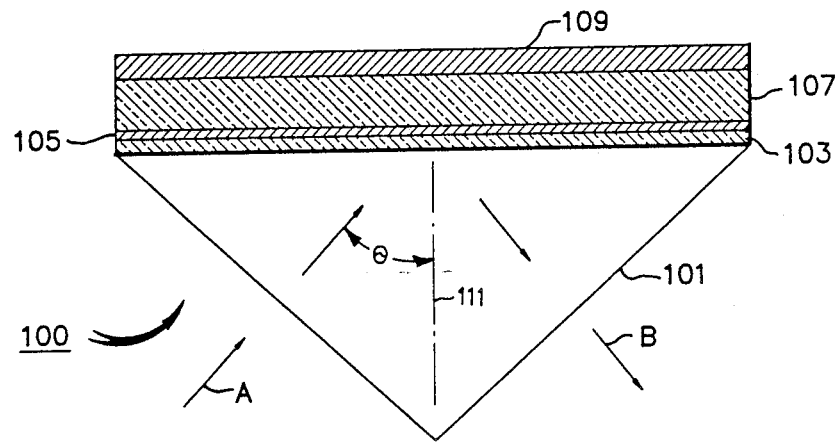
FIG. 1 is a schematic view of a nonlinear optical article according to the invention including a prism for optical coupling.

In FIG. 1 an attenuated total reflection optical article 100 capable of modulating reflection by controlled attentuation of incident electromagnetic radiation is illustrated. Electromagnetic radiation is shown at A to be optically coupled into the article through prism 101. In one operating condition of the optical article substantially all of the electromagnetic radiation received is reflected, as indicated at B. In varied operating conditions the optical article is capable of attenuating the electromagnetic radiation. The optical article 100 can be employed as a switch or modulator for reflected electromagnetic radiation.

On the base of the prism is coated a first dielectric layer 103 having a thickness in the range of from 0.1 to 10 (preferably 0.3 to 5) times the wavelength of t electromagnetic radiation.

Overlying the first dielectric layer is a reflective metal layer 105. The reflective metal layer is sufficiently thick to be reflective, at least 50 Å (preferably at least 100 Å), yet is sufficiently thin to be penetrable by the electromagnetic radiation, no thicker than about 0.5 $\mu$m (preferably no thicker than about 300 Å).

A second dielectric layer 107 capable of exhibiting a change in its refractive index as a function of an applied electrical potential gradient overlies the reflective metal layer. The second dielectric layer takes the form of a polymeric layer having a high second order polarization susceptibility containing aligned organic molecular dipoles having an electron donor moiety linked through a conjugated $\pi$ bonding system to an electron acceptor moiety. The polymeric layer is readily spin cast as a thin, uniform layer. The incorporation of organic molecular dipoles allows high $\chi^{(2)}$ values to be realized while at the same offering a response frequency much higher than can be achieved with liquid crystals.

The device is completed by an electrode 109 or similar suitable means for applying an electrical potential gradient across the poled polymeric layer.

The first and second dielectric layers are chosen so that under at least one condition of electrical biasing the two dielectric layers exhibit refractive indices that differ by less than 20 percent (preferably less than 10 percent). Optimum attenuation of incident electromagnetic radiation occurs when the refractive index of the second dielectric layer is greater than that of the first dielectric layer.

In one exemplary form the device can be employed for switching or modulation of electromagnetic radiation as follows: In the absence of an applied potential between the reflective metal layer and the electrode 109 the device in one form can exhibit refractive indices in the first and second dielectric layers that differ by less than 20 percent (preferably less than 10 percent) or that are optimally matched, as indicated above At one value of the angle $\Theta$, the angle which incident radiation forms with an 111 perpendicular to the plane of the reflective metal layer, incident electromagnetic radiation is propagated along the interface of the reflective metal layer with the first dielectric layer and also along the interface of the reflective metal layer with the second dielectric layer. When the refractive indices of the dielectric layers are optimally related for the selected angle $\Theta$, the electromagnetic waves traveling at each interface are able to couple with each other by reason of the limited thickness of the reflective metal layer. This increases reflection attenuation by increasing propagation in the plane of the reflective metal layer and reduces reflection of electromagnetic radiation.

Since the polymeric layer by reason of its high second order polarization susceptibility is capable of changing its refractive index by varying the potential difference placed across the reflective metal layer and the electrode, it is apparent that the device can be shifted progressively or switched from a high attenuation mode to a minimum attenuation mode merely by adjusting the potential difference across the polymeric layer.

Although in the foregoing description the device exhibits maximum attentuation of electromagnetic radiation in the absence of an applied electrical potential, it is readily appreciated that the refractive indices of the dielectric layers can be chosen so that a potential bias impressed across the high $\chi^{(2)}$ polymeric layer is required to bring the refractive index within the ranges indicated above for attenuation. In this construction the device can exhibit a high degree of reflection in the absence of an applied potential and a maximum degree of attenuation with an applied potential. It is also possible to construct the optical article so that both maximum attentuation and maximum reflection are achieved with differing potential biases applied.

Instead of employing the optical article 100 as a long range surface plasmon device in the manner indicated above, it is also possible to operate the device as a guided mode device. By reducing the angle $\Theta$ attenuation can be shifted into the polymeric dielectric layer. A choice of angles are available for achieving guided mode operation. Generally best results are achieved at the first (zero order) guided mode angle $\Theta$ encountered below the value of $\Theta$ that produces a long range surface plasmon.

Appropriate angles of incidence of collimated polarized electromagnetic radiation can be calculated from known physical relationships. Optimum angles can also be readily determined simply by varying the angles of incidence and observing the optimum angles for modulation.

Although optical article 100 is shown to be formed on the base of a prism, it is appreciated that the optical articles of this invention can be formed on any conventional optical coupling substrate, such as an optical grating or a waveguide (e.g., an optical fiber).

Figure 2:
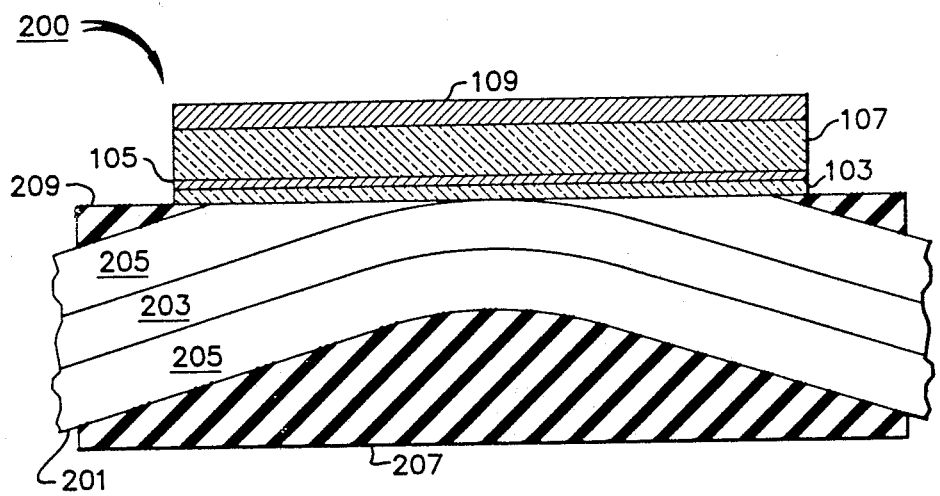
FIG. 2 is a schematic view of another nonlinear optical article according to the invention including an optical fiber for optical coupling.

In FIG. 2, an optical article 200 is shown differing from optical article 100 solely by the substitution of an alternative optical coupling support arrangement for the prism. An optical fiber 201 comprised of a core 203 of a material, such as glass or an organic polymer, which is transparent to electromagnetic radiation at the wavelength being propagated. Concentrically surrounding the core is a cladding layer 205 which is similar, but differs in that it exhibits a refractive index which is lower than that of the core. By forming the cladding layer of a lower refractive index material the electromagnetic radiation being propagated is directed back into the core upon impinging the cladding layer The optical fiber in its curved configuration shown is cast in a mounting block 207. By lapping an optically smooth surface 209 is formed. Lapping removes a portion of cladding layer from the optical fiber, so that its core lies adjacent the optical surface. Layer 103 is then deposited on the optical surface, and the remaining layers of the device are formed as previously described.

Operation of the device 200 can be generally similar to that described above for device 100. Since the optical fiber is locked in position, the optimum angle for directing electromagnetic radiation to the reflective metal layer must be determined prior to locating the optical fiber in the casting block. In addition to modulating and switching electromagnetic radiation as described above, it possible to use the device 200 to remove p-components from the polarized electromagnetic radiation being transmitted in the optical fiber.

In one preferred form the first dielectric layer can be a metal oxide or fluoride layer. Since oxygen and fluorine generally form relatively inert stable compounds with metals, it is apparent that the protective layer can be formed from a broad selection of metal fluorides and oxides Alkaline earth oxides (particularly magnesia), rare earth oxides, alumina, and silica constitute preferred metal oxides for use in the practice of this invention. However, any stable metal oxide that can be readily deposited in an amorphous form can be employed. Alkali metal fluorides (e.g., lithium fluoride) and alkaline earth metal fluorides (e.g., calcium or magnesium fluoride) constitute preferred metal fluorides. Rare earth fluorides are also contemplated. Mixed metal oxides, mixed metal fluorides, and mixtures of metal fluorides and oxides are all contemplated. Mixtures offer the advantage of increasing steric disorder, thereby suppressing crystallization and preserving the desired amorphous nature of the coating.

Any conventional technique for depositing the metal fluoride or oxide layer compatible with the metal surface onto which deposition is intended can be undertaken. Vacuum vapor deposition, sputtering, chemical vapor deposition, molecular beam epitaxy, liquid phase epitaxy, electrolytic oxidative coating, and similar conventional coating processes can be employed. While these deposition techniques lend themselves to forming protective layers of less than 0.1 μm in thickness, they do not lend themselves to forming thicker layers.

It is specifically contemplated to form metal fluoride coatings by the thermal decomposition of a metal carboxylate (e.g., a metal acetate or 2-ethylhexanoate) in the presence of fluorinating agent (e.g.. heptafluorobutyric acid) This method is the subject matter of Paz-Pujalt U.S. Ser. No. 377,646, filed Jul. 10, 1989, titled METHOD OF FORMING METAL FLUORIDE FILMS BY THE DECOMPOSITION OF METALLOORGANIC FILMS IN THE PRESENCE OF A FLUORINATING AGENT, commonly assigned.

Instead of forming the first dielectric layer of a metal oxide or fluoride, in an alternative preferred form of the invention the first dielectric layer is formed of one or more amorphous low molecular weight aromatic compounds.

By "amorphous" it is meant that there is substantially no crystallinity in the layer or microstructure attributed to the coating process. This can be determined by visual inspection under a microscope; by Raman spectroscopic techniques; or by the observation of scattered light from the waveguide or device.

The term "low molecular weight" is employed to designate those aromatic compounds having a molecular weight below about 1000. In other words, film forming polymers, which typically have a molecular weight of at least 5,000 are excluded.

Low molecular weight aromatic compounds whose vapor pressure is sufficiently high so that the compound can be vacuum deposited are preferred.

Low molecular weight aromatic compounds are useful in the present invention are solids at room temperature. They preferably have a glass transition temperature of greater than about 50° C. Glass transition temperature is measured using conventional techniques, such as differential scanning calorimetry. The measurement should be taken from amorphous bulk material that is substantially free from residual solvents and decomposition products since that is the condition of the materials when they are vacuum coated.

The low molecular weight aromatic compounds contain at least one aromatic carbocyclic or heterocyclic ring. In a preferred form the compounds can be the "multicyclic aromatic nucleus" compounds described in U.S. Pat. No. 4,499,165 or derivatives thereof.

A "multicyclic aromatic nucleus" is a nucleus comprising at least two cyclic groups one of which is aromatic, including aromatic heterocyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole oxazole, imide, pyrazole, triazole, oxadiazole, pyridine, pyrimidine, pyrazine, triazine, tetrazine and quinoline groups. The substituents are fused or non fused and mono or polycyclic. Examples of multicyclic aromatic nuclei include 9,9-bis(4-hydroxy-3,5-dichlorophenyl)fluoroene, 4,4'-hexahydro-4,7-methanoindan-5-ylidenebis(2,6-dichlorophenol); 9,9-bis(4-hydroxy-3,5-dibromophenyl)fluorene, 4,4'-hexahydro-4,7-methanoindan-5-ylidenebis(2,6-dibromophenol); 3',3",5',5"-tetrabromophenolphthalein, 9,9-bis(4-aminophenyl)fluorene, phenylindandiols; 1,1'-spirobiinadandiols, 1,1'-spirobiindandiamines, 2,2'-spirobichromans; 7,7-dimethyl-7H-dibenzo[c,h]xanthenediol; 9,9-dimethylxanthene-3,6-bis(oxyacetic acids); 4,4'-(3-phenyl-1-indanylidene)diphenol and other bisphenols; 9-phenyl-3-oxo-2,6,7-trihydroxyxanthene; and the like.

Useful multicyclic aromatic nuclei compounds are:

A. The phenylindan diols disclosed in *Research Disclosure*, Item No. 11833, February 1974, and U.S. Pat. Nos. 3,830,096, 3,859,364 and 3,886,124 and the phenylindan diamines of U.S. Pat. Nos. 3,897,253 and 3,915,939, B. The 1,1'-spirobiindan diols and diamines disclosed in U.S. Pat. No. 3,725,070; and the 1,1'-spirobiindan (dicarboxylic acids) of *Research Disclosure*, Item No. 9830, June 1972 (anonymous), C. The 1,1'-spirobiindan-5,5'-diamines disclosed in *Research Disclosure*, Item No. 13117, March 1975, D. The 2,2'-spirobichromans disclosed in U.S. Pat. No. 3,859,097, E. The 7,7-dimethyl-7H-dibenzo[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, June 1972 (anonymous), G. The 4,4'-(3-phenyl-1-indanylidene)diphenols disclosed in *Research Disclose*, Item No. 13101, March 1975, H. The 4,4'-(hexahydro-4,7-methanoindan-5-ylidene)diphenols disclosed in *Research Disclosure*, Item No. 13568, July 1975, I. The bisphenols disclosed in *Research Disclosure*, Item No. 13569, July 1975, J. The sulfonyldibenzoic acids disclosed in *Research Disclosure*, Item No. 14016, Dec. 1975, K. The polycyclic norbornanes of *Research Disclosure*, Item No. 9207, December 1971, and L. The 1,2,3,4-tetrahydronaphthalenes disclosed in *Research Disclosure*, Item No. 13570, July 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds Preferred compounds are substituted phenylindan compounds and phthalimide compounds described below.

The phenylindan compounds have the structure:

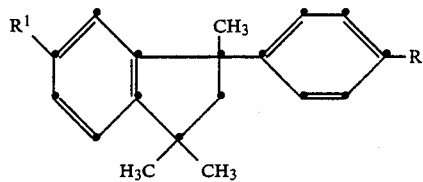

R and $R^1$ are independently selected from the group consisting of nitro, amino, carboxyl, formamido groups, carbamoyl groups and heterocyclic groups derived from amino or carboxyl groups.

Useful formamido and carbamoyl groups are represented by the formulae —$NHCOR^2$ and —$ONR^2R^3$ respectively, wherein $R^2$ and $R^3$ are independently selected from the group consisting of unsubstituted and substituted aliphatic, aromatic and heterocyclic groups such that the molecular weight of the compound is less than about 1000.

Useful al groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-prophenyl and 1-cyclohexenyl.

Useful aromatic groups include phenyl and naphthyl and substituted aromatic such as aromatic substituted with halogen, alkyl, cyano, alkoxy and hydroxy such as 4-methoxy phenyl and 3,4-dichloro phenyl.

Useful heterocyclic groups include pyridyl, furanyl, thiophenyl, quinolyl and piperidyl; and substituted heterocyclic such as heterocyclic substituted with alkyl, halogen and alkoxy such as 5-butylpyridyl.

Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

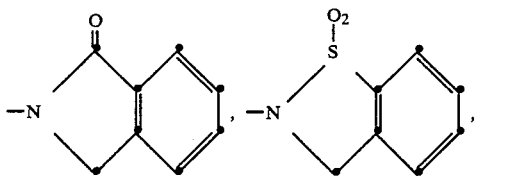

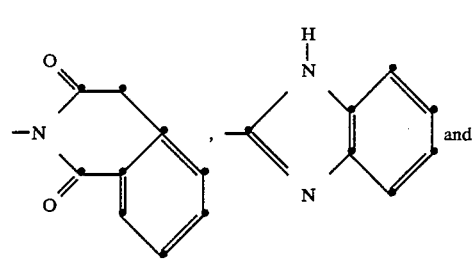

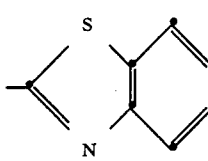

The formamido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane.

The similar carbamoyl compounds are made in a similar manner starting from the phenylindandicarboxylic acid, converting it to the corresponding acid chloride and reacting the acid chloride with the desired amine.

Where R and $R^1$ are different, mixtures of the side chain precursors are used and the compound isolated by liquid chromotography. In preferred embodiments, there is no need to resolve the mixture as it is useful directly.

Exemplary preferred phenylindan compounds are listed in Table I All of the refractive indices reported in this table and subsequently were measured at 632 nm.

TABLE I

| Compound | R | Refractive Index | Tg °C. |
|---|---|---|---|
| TEL-1 | —$CONH_2$ | 1.613 | 110 |
| TEL-2 | —NHCO—⟨phenyl⟩—$OCH_3$ | 1.630 | 114 |
| TEL-3 | —NHCO—⟨phenyl⟩—Cl | 1.629 | 118 |
| TEL-4 | —NHCO—⟨phenyl⟩—Br | 1.647 | 134 |
| TEL-5 | —NHCO—⟨phenyl⟩—CN | 1.677 | 138 |
| TEL-6 | —NHCO—⟨phenyl⟩ | 1.634 | 114 |
| TEL-7 | —NHCO—⟨phenyl(Cl)⟩—Cl | 1.649 | 127 |
| TEL-8 | —NHCO—⟨phenyl-$F_5$⟩ | 1.548 | 123 |

TABLE I-continued

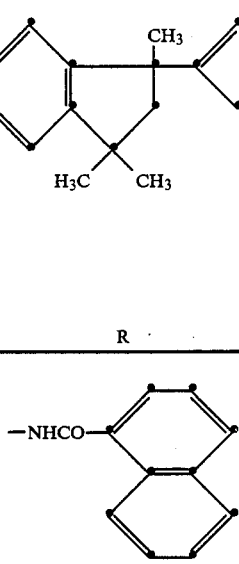

| Compound | R | Refractive Index | Tg °C |
|---|---|---|---|
| TEL-9 | —NHCO—[naphthyl] | 1.656 | 133 |
| TEL-10 | —CONH—[phenyl]—Br | 1.659 | 136 |
| TEL-11 | —NHCO—[phenyl] | 1.569 | 150 |
| TEL-12 | —NHCOCH$_2$C(CH$_3$)$_3$ | 1.537 | 112 |
| TEL-13 | —NHCOCH$_2$CH$_2$CH$_3$ | 1.572 | 78 |
| TEL-14 | —NHCOCF$_2$CF$_2$CF$_3$ | 1.472 | 60 |
| TEL-15 | —CON—[phenyl]$_2$ | 1.548 | 99 |
| TEL-16 | —CONHC(CH$_3$)(CH$_2$CH$_3$)CH$_3$ | 1.545 | 86 |
| TEL-17 | —N[phthalimide-CH$_3$] | 1.660 | 128 |
| TEL-18 | Mixture of | 1.654 | 121 |

TABLE I-continued

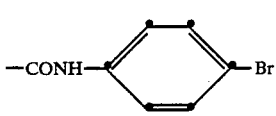

| Compound | R | Refractive Index | Tg °C |
|---|---|---|---|
| | —NHCO—[phenyl]—Br | | |
| | —NHCO—[naphthyl], and | | |
| | —NHCO—[phenyl]—OCH$_3$ | | |

Preferred phthalimide compounds are disclosed by Machiele et al U.S. Ser. No. 273,550, filed Nov. 21, 1988, commonly assigned. The phthalimide compounds have the structure:

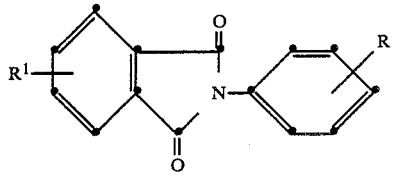

wherein R and R$^1$ are as defined above.

The symmetrically substituted compounds, that is R=R$^1$, are made starting with nitro phthalic anhydride. This is reacted with a nitroaniline to give a dinitro N phenyl phthalimide. This in turn is reduced to the corresponding diamino compound which is then reacted with the oxychloride of the desired side chain.

The similar unsymmetrical compounds are made by reacting the appropriately substituted aniline with the proper nitro phthalic anhydride followed by reduction to the corresponding amine The amine is then reacted with the desired acid chloride.

Exemplary phthalimides are listed in Table II.

TABLE II
TEL-19 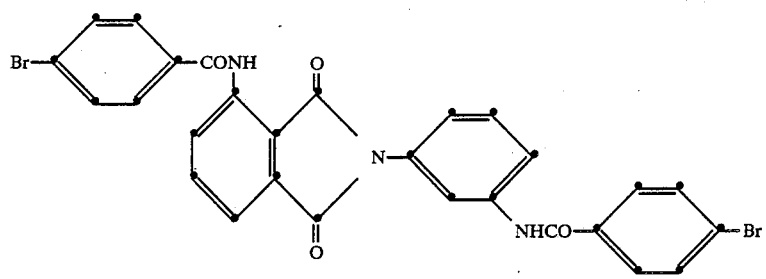
Index: 1.703
(second sample
index = 1.705)
mp: >240°
TEL-20 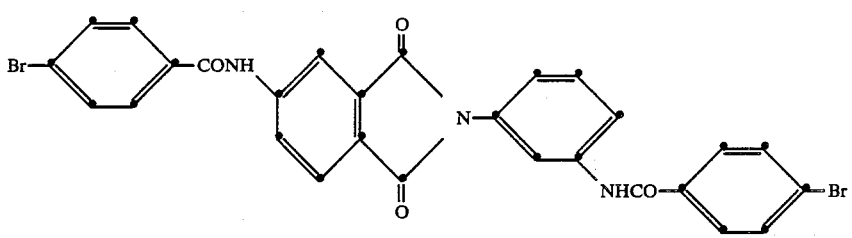
Index: 1.776
mp: >240°
TEL-21 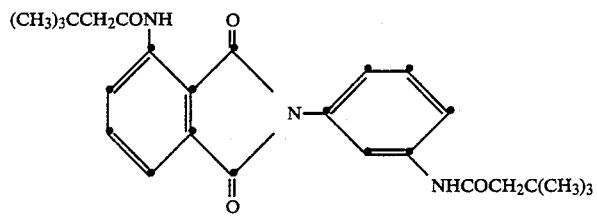
Index: 1.578
mp: 197–200°
TEL-22 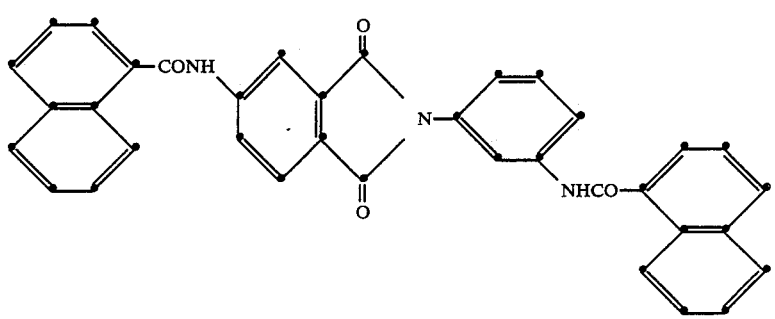
Index: 1.670
mp: >240°
TEL-23 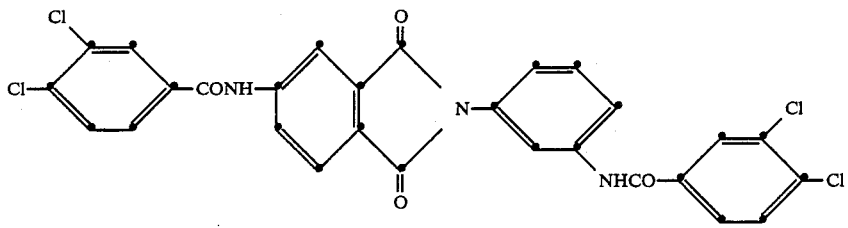
Index: 1.737
mp: >240°
TEL-24 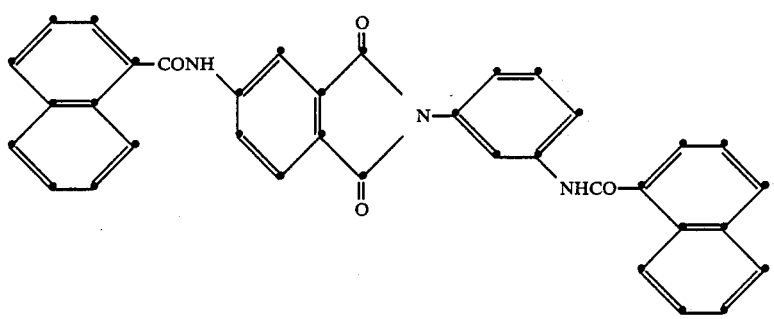
Index: 1.744
(50:50 mixture co-
evaporated from
sources)

TABLE II-continued
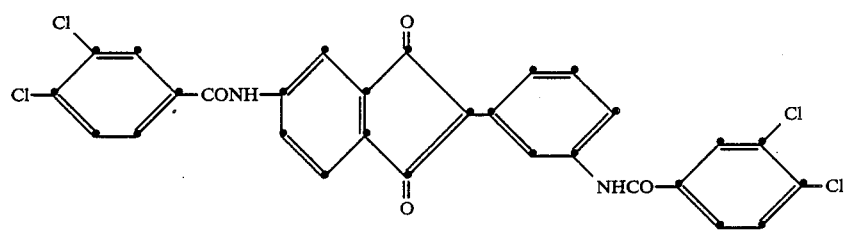
TEL-25
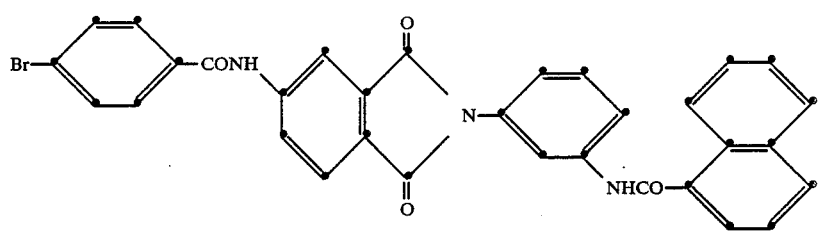
Index: 1.739
mp: 214–222°
TEL-26
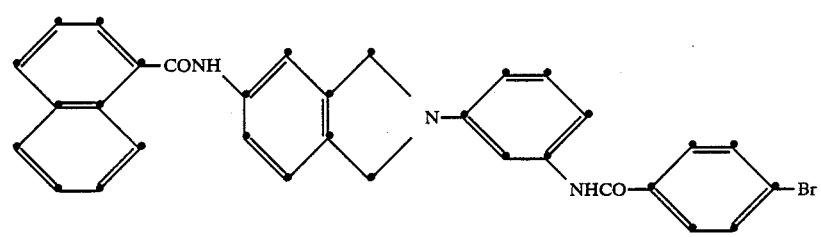
Index: 1.751
mp: 231–235°
TEL-27
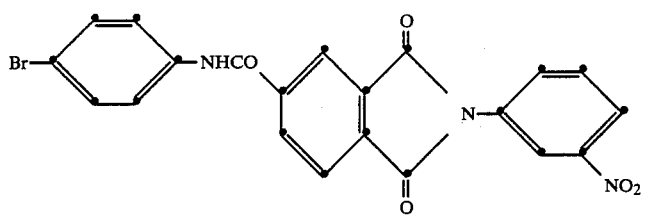
Index: 1.704
mp: 256–259°
TEL-28
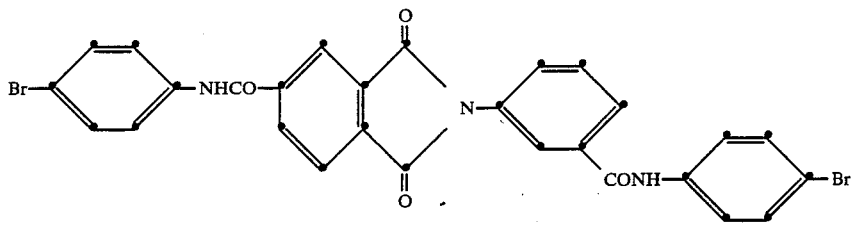
mp: >260°
TEL-29
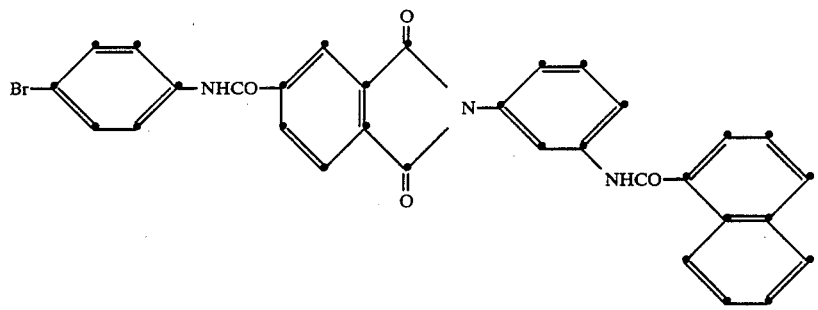
Still other exemplary low molecular weight aromatic compounds useful as transmission enhancement layers the practice of this invention are listed in Table III.

TABLE III

| Compound | Structure | R | Refractive Index |
|---|---|---|---|
| TEL-30, -31, -32 | RHN-[biphenyl-fluorene]-NHR | —COCH$_2$C(CH$_3$)$_3$<br>—H<br>—CO—C$_6$H$_4$—Br | 1.599<br>1.701<br>1.708 |
| TEL-33, -34 | RO-[dibromophenyl-spiro]-OR (with Br substituents) | —COCH$_2$C(CH$_3$)$_3$<br>—OH | 1.572<br>1.659 |
| TEL-35, -36, -37 | RO-[bis(dimethyl)indane-phenyl]-OR | —COCH$_2$C(CH$_3$)$_3$<br>—H<br>—CO—C$_6$H$_4$—Br | 1.514<br>1.575<br>1.610 |
| TEL-38, -39, -40 | RNH-[phthalimide-phenyl]-NHR | —COCH$_2$C(CH$_3$)$_3$<br>—H<br>—CO—C$_6$H$_4$—Br | 1.578<br>1.755<br>1.731 |

Vacuum vapor deposition of the low molecular weight aromatic compounds can be achieved using any convenient conventional vacuum apparatus. A typical vacuum coating apparatus will include a vacuum chamber which is connected to a mechanical vacuum pump which typically provides a pressure as low as about $10^{-3}$ mm Hg. In addition, a diffusion pump is provided to reduce the vacuum further, typically down to about $10^{-6}$ mm Hg. Inside the chamber, there is provided an evaporation source for the material. The container is typically covered, the cover having an opening to direct the flow of material. The substrate to be coated is usually above the container. The uniformity of the coating can be improved by increasing the distance between container and the support.

Metal oxides, metal fluorides, and mixtures of these inorganic materials, hereinafter also referred to as category (a) materials, are preferably used alone for forming first dielectric layers of less dielectric than 0.1 μm. When it is preferred to form the first layer of a thickness greater than about 0.2 μm, it is preferred to employ one or a combination of low molecular weight aromatic compounds, hereinafter referred to as category (b) materials. Category (a) materials are more stable and more resistant to solvents than category (b) materials, but have the disadvantage that they do not conveniently form smooth, uniform layers within the highest thickness ranges of the first dielectric layer contemplated by the invention. Category (b) materials readily form smooth thicker layers, but with the disadvantages indicated. By employing category (a) and (b) materials in combination it is possible to realize both the greater layer thickness capabilities of category (b) materials and the enhanced stabilities of category (a) materials. It is preferred to employ category (a) and (b) materials in combination in weight ratios of (a):(b) of from 20:80 to 90:10 (preferably 50:50 to 80:20). Blends of category (a) and (b) materials can be readily obtained by concurrent vacuum vapor deposition.

The second dielectric layer forms the nonlinear optical layer of the device. It can be constructed of any polymeric medium exhibiting a high ($>10^{-9}$ esu) second order polarization susceptibility containing organic molecular dipoles containing an electron donor moiety linked through a conjugated π bonding system to an electron acceptor medium. organic molecular dipole can itself form a part of a polymer as a repeating unit in the polymer backbone or, more commonly, as a pendant group. Alternatively, the organic molecular dipole can be present as a separate compound physically blended a polymer binder. The polymer portion of the layer can be either a linear or a crosslinked polymer.

A wide variety of organic molecular dipoles suitable for use in the practice of this invention as well as polymers, forming a part of the organic molecular dipoles or employed as separate binders, are known and are exemplified by the following:

NLO-1: Williams, cited above;
NLO-2: Garito U.S. Pat. No. 4,536,450, issued Aug. 20, 1985;
NLO-3: European Patent Application No. 0,186,999, published Jul. 9, 1986;
NLO-4: Zyss, cited above;
NLO-5: Choe U.S. Pat. No. 4,603,187, issued Jul. 29, 1986;
NLO-6: Choe et al., U.S. Pat. No. 4,707,305, issued Nov. 17, 1987;
NLO-7: Choe et al., U.S. Pat. No. 4,667,042, issued May 19, 1987;
NLO-8: Choe et al., U.S. Pat. No. 4,650,609, issued Mar. 17, 1987;
NLO-9: Choe U.S. Pat. No. 4,579,915, issued Apr. 1, 1986;
NLO-10: DeMartino U.S. Pat. No. 4,720,355, issued Jan. 19, 1988;
NLO-11: Choe et al., U.S. Pat. No. 4,732,783, issued Mar. 22, 1988;
NLO-12: Kobayashi et al., Chemical Physics Letters, Vol. 121, No. 4,5, pp. 356–360, Nov. 15, 1985;
NLO-13: DeMartino U.S. Pat. No. 4,766,171, issued Aug. 23, 1988;
NLO-14: DeMartino et al., U.S. Pat. No. 4,694,066, issued Sept. 15, 1987;
NLO-15: DeMartino et al., U.S. Pat. No. 4,835,235, issued May 30, 1989;
NLO-16: Choe U.S. Pat. No. 4,711, 532, issued Dec. 8, 1987;
NLO-17: Choe U.S. Pat. No. 4,694,048, issued Sept. 15, 1987;
NLO-18: Choe U.S. Pat. No. 4,703,096, issued Oct. 27, 1987;
NLO-19: Choe U.S. Pat. No. 4,719,28, issued Jan. 12, 1988;
NLO-20: Milverton et al., U.S. Pat. No. 4,818,616, issued Apr. 4, 1989;
NLO-21: Leslie et al., U.S. Pat. No. 4,796,976, issued Jan. 10, 1989;
NLO-22: Choe U.S. Pat. No. 4,804,255, issued Feb. 14, 1989;
NLO-23: Leslie U.S. Pat. No. 4,801,659, issued Jan. 31, 1989;
NLO-24: Leslie U.S. Pat. No. 4,807,968, issued Feb. 28, 1989;
NLO-25: Teng et al., U.S. Pat. No. 4,775,215, issued Oct. 4, 1988;
NLO-26: Robin et al., U.S. Pat. No. 4,794,045, issued Dec. 27, 1988;
NLO-27: Gillberg-LaForce et al. U.S. Pat. No. 4,728,576, issued Mar. 1, 1988;
NLO-28: DeMartino U.S. Pat. No. 4,779,961, issued Oct. 25, 1988;
NLO-29: DeMartino U.S. Pat. No. 4,757,130, issued Jul. 22, 1988;
NLO-30: Choe U.S. Pat. No. 4,824,219, issued Apr. 25, 1989;
NLO-31: Ulman et al., cited above;
NLO-32: DeMartino et al. U.S. Pat. No. 4,808,332, issued Feb. 28, 1989;
NLO-33: Robello et al., U.S. Pat. No. 4,796,971, issued Jan. 10, 1989;
NLO-34: DeMartino et al., U.S. Pat. No. 4,822,865, issued Apr. 18, 1989.
NLO-35: DeMartino et al., U.S. Pat. No. 4,801,670, issued Jan. 31, 1989;
NLO-36: Robello European Patent Application No. 0,313,477, published Apr. 26, 1986.

Specifically preferred organic nonlinear optical layers are those which can be formed by poling linear condensation and vinyl polymers including noncentrosymmetric molecular dipoles as pendant or backbone groups. The molecular dipoles include an electron donor moiety, such as an amino, oxy, or thio group, linked through a conjugated π bonding system to an electron acceptor moiety, as a sulfonyl, cyano, or nitro group, to permit oscillation of the molecular dipole between a lower polarity ground state and a higher polarity excited state. A preferred conjugated π bonding system is provided by a 4,4'-stilbene or 4,4'-diazobenzene linkage between the electron acceptor or electron donor moiety. The molecular dipole can be linked to the polymer backbone through the electron donor or acceptor moiety or incorporated in the polymer backbone by linkages through both the electron acceptor and donor moieties. Such compounds are specifically illustrated by NLO-31 and NLO-36, listed above.

The formation of organic layers by Langmuir Blodgett and self assembled monolayer techniques are illustrated by NLO-31. In addition Scozzafava et al U.S. Ser. No. 101,897, filed Sept. 28, 1987, discloses crosslinking techniques for forming poled organic polymer layers.

The following are illustrative of preferred molecular dipole monomers suitable for producing condensation polymers that can be poled to form the nonlinear optical layers:

TABLE IV

| | |
|---|---|
| NOCM-1 | 4'-{N-[5-(Methoxycarbonyl)pentyl]-N-methylamino}-4-(6-hydroxyhexyl)sulfonylazobenzene |
| NOCM-2 | 4'-{N-[5-(Butoxycarbonyl)pentyl]-N-methylamino}-4-(6-hydroxyhexyl)sulfonylazobenzene |
| NOCM-3 | 4'-{N-[5-(Methoxycarbonyl)pentyl]-N-methylamino}-4-(6-hydroxyhexyl)sulfonylstilbene |
| NOCM-4 | 4'-{N-[5-(Butoxycarbonyl)pentyl]-N-methylamino}-4-(6-hydroxyhexyl)sulfonylstilbene |
| NOCM-5 | 4'-[N-(Methoxycarbonyl)methyl-N-methylamino]-4-(6-hydroxyhexyl)sulfonylazobenzene |
| NOCM-6 | 4'-[N-(Ethoxycarbonyl)methyl-N-methylamino]-4-(6-hydroxyhexyl)sulfonylazobenzene |
| NOCM-7 | 4'-[N-(Methoxycarbonyl)methyl-N-methylamino]-4-(6-hydroxyhexyl)sulfonylstilbene |
| NOCM-8 | 4'-[N-(Ethoxycarbonyl)methyl-N-methylamino]-4-(6-hydroxyhexyl)sulfonylstilbene |
| NOCM-9 | 4'-[N-(6-Hydroxyhexyl)-N-methylamino]-4-[2-(methoxycarbonyl)ethyl]sulfonylazobenzene |
| NOCM-10 | 4'-[N-(6-Hydroxyhexyl)-N-methylamino]-4-[2-(ethoxycarbonyl)ethyl]sulfonylazobenzene |
| NOCM-11 | 4'-[N-(6-Hydroxyhexyl)-N-methylamino]-4-[2-(methoxycarbonyl)ethyl]sulfonylstilbene |
| NOCM-12 | 4'-[N-(6-Hydroxyhexyl)-N-methylamino]-4-[2-(ethoxycarbony)ethyl]sulfonylstilbene |
| NOCM-13 | 4'-[N-(2-Hydroxyethyl)-N-methylamino]-4-[2- |

TABLE IV-continued

| | |
|---|---|
| | (methoxycarbonyl)ethyl]sulfonylazobenzene |
| NOCM-14 | 4'-[N-(2-Hydroxyethyl)-N-methylamino]-4-[2-(ethoxycarbonyl)ethyl]sulfonylazobenzene |
| NOCM-15 | 4'-[N-(2-Hydroxyethyl)-N-methylamino]-4-[2-(methoxycarbonyl)ethyl]sulfonylstilbene |
| NOCM-16 | 4'-[N-(2-Hydroxyethyl)-N-methylamino]-4-[2-(ethoxycarbonyl)ethyl]sulfonylstilbene |
| NOCM-17 | 4'-[N-(2-Hydroxyhexyl)-N-methylamino]-4-[5-(methoxycarbonyl)pentyl]sulfonylazobenzene |
| NOCM-18 | 4'-[N-(2-Hydroxyhexyl)-N-methylamino]-4-[5-(methoxycarbonyl)pentyl]sulfonylstilbene |
| NOCM-19 | 4'-(4-Hydroxy-1-piperidinyl)-4-[2-(methoxycarbonyl)ethyl]sulfonylazobenzene |
| NOCM-20 | 4'-(4-Hydrox-1-piperidinyl)-4-[2-(methoxycarbonyl)ethyl]sulfonylstilbene |

The following are illustrative of preferred molecular dipole monomers suitable for producing vinyl polymers that can be poled to form the nonlinear optical layers:

TABLE V

| | |
|---|---|
| NOVM-1 | 4'-[N-(2-acryloyloxyethyl-N-methylamino]-4-methylsulfonylstilbene |
| NOVM-2 | 4'-[N-(2-methacryloyloxyethyl-N-methyl-amino]-4-methylsulfonylstilbene |
| NOVM-3 | 4'-[N-(6-acryloyloxyhexyl)-N-methylamino]-4-methylsulfonylstilbene |
| NOVM-4 | 4'-[N-(6-methacryloyloxyhexyl)-N-methylamino]-4-methylsulfonylstilbene |
| NOVM-5 | 4'-[4-acryloyloxy-1-piperidyl]-4-methylsulfonylstilbene |
| NOVM-6 | 4'-[4-methacryloyloxy-1-piperidyl]-4-methylsulfonylstilbene |
| NOVM-7 | 4'-[N-(2-acryloyloxyethyl)-N-methylamino]-4-phenylsulfonylstilbene |
| NOVM-8 | 4'-[N-(2-methacryloyloxyethyl)-N-methylamino]-4-phenylsulfonylstilbene |
| NOVM-9 | 4'-[N-(6-acryloyloxyhexyl)-N-methylamino]-4-phenylsulfonylstilbene |
| NOVM-10 | 4'-[N-(6-methacryloyloxyhexyl)-N-methylamino]-4-phenylsulfonylstilbene |
| NOVM-11 | 4'-[4-acryloyloxy-1-piperidyl]-4-phenylsulfonylstilbene |
| NOVM-12 | 4'-[4-methacryloyloxy-1-piperidyl]-4-phenylsulfonylstilbene |
| NOVM-13 | 4'-[N-(2-acryloyloxyethyl)-N-methylamino]-4-(R-2-methylbutyl)sulfonylstilbene |
| NOVM-14 | 4'-[N-(2-methacryloyloxyethyl)-N-methylamino]-4-(R-2-methylbutyl)sulfonylstilbene |
| NOVM-15 | 4'-[N-(6-acryloyloxyethyl)-methylamino]-4-(R-2-methylbutyl)sulfonylstilbene |
| NOVM-16 | 4'-[N-(6-methacryloyloxyethyl)-N-methylamino]-4-(R-2-methylbutyl)sulfonylstilbene |
| NOVM-17 | 4'-[4-acryloyloxy-1-piperidyl]-4-(R-2-methylbutyl)sulfonylstilbene |
| NOVM-18 | 4'-[4-methacryloyloxy-1-piperidyl]-4-(R-2-methylbutyl)sulfonylstilbene |
| NOVM-19 | 4'-(2-acryloyloxyethoxy)-4-methylsulfonylstilbene |
| NOVM-20 | 4'-(2-methacryloyloxyethoxy)-4-methylsulfonylstilbene |
| NOVM-21 | 4'-(6-acryloyloxyhexoxy)-4-methylsulfonylstilbene |
| NOVM-22 | 4'-(6-methacryloyloxyhexoxy)-4-methylsulfonylstilbene |
| NOVM-23 | 4'-(2-acryloyloxyethoxy)-4-phenylsulfonylstilbene |
| NOVM-24 | 4'-(2-methacryloyloxyethoxy)-4-phenylsulfonylstilbene |
| NOVM-25 | 4'-(6-acryloyloxyhexoxy)-4-phenylsulfonylstilbene |
| NOVM-26 | 4'-(6-methacryloyloxyhexoxy)-4-phenylsulfonylstilbene |
| NOVM-27 | 4'-(2-acryloyloxyethoxy)-4-(R-2-methylbutyl)sulfonylstilbene |
| NOVM-28 | 4'-(2-methacryloyloxyethoxy)-4-(R-2-methylbutyl)sulfonylstilbene |
| NOVM-29 | 4'-(6-acryloyloxyhexoxy)-4-(R-2-methylbutyl)sulfonylstilbene |
| NOVM-30 | 4'-(6-methacryloyloxyhexoxy)-4-(R-2-methyl- |

TABLE V-continued

| | |
|---|---|
| | butyl)sulfonylstilbene |
| NOVM-31 | 4'-(2-acryloyloxyethylthio)-4-methylsulfonylstilbene |
| NOVM-32 | 4'-(2-methacryloyloxyethylthio)-4-methylsulfonylstilbene |
| NOVM-33 | 4'-(6-acryloyloxyhexylthio)-4-methylsulfonylstilbene |
| NOVM-34 | 4'-(6-methacryloyloxyhexylthio)-4-methylsulfonylstilbene |
| NOVM-35 | 4'(2-acryloyloxyethylthio)-4-phenylsulfonylstilbene |
| NOVM-36 | 4'(2-methacryloyloxyethylthio)-4-phenylsulfonylstilbene |
| NOVM-37 | 4'-(6-acryloyloxyhexylthio)-4-phenylsulfonylstilbene |
| NOVM-38 | 4'-(6-methacryloyloxyhexylthio)-4-phenylsulfonylstilbene |
| NOVM-39 | 4'-(2-acryloyloxyethylthio)-4-(R-2-methylbutyl)sulfonylstilbene |
| NOVM-40 | 4'-(2-methacryloyloxyethylthio)-4-(R-2-methylbutyl)sulfonylstilbene |
| NOVM-41 | 4'-(6-acryloyloxyhexylthio-4-(R-2-methylbutyl)sulfonylstilbene |
| NOVM-42 | 4'-(6-methacryloyloxyhexylthio-4-(R-2-methylbutyl)sulfonylstilbene |
| NOVM-43 | 4'-dimethylamino-4-(6-acryloyloxyhexyl)sulfonylstilbene |
| NOVM-44 | 4'-dimethylamino-4-(6-methacryloyloxyhexyl)sulfonylstilbene |
| NOVM-45 | 4'-(1-pyrrolidino)-4-(6-acryloyloxyhexyl)sulfonylstilbene |
| NOVM-46 | 4'-(1-pyrrolidino)-4-(6-methacryloyloxyhexyl)sulfonylstilbene |
| NOVM-47 | 4'-[N-(R-2-methylbutyl)-N-methylamino]-4-(6-acryloyloxyhexyl)sulfonylstilbene |
| NOVM-48 | 4'-[N-(R-2-methylbutyl)-N-methylamino]-4-(6-methacryloyloxyhexyl)sulfonylstilbene |
| NOVM-49 | 4'-methoxy-4-(6-acryloyloxyhexyl)sulfonylstilbene |
| NOVM-50 | 4'-methoxy-4-(6-methacryloyloxyhexyl)sulfonylstilbene |
| NOVM-51 | 4'(R-2-methylbutoxy)-4-(6-acryloyloxyhexyl)sulfonylstilbene |
| NOVM-52 | 4'(R-2-methylbutoxy)-4-(6-methacryloyloxyhexyl)sulfonylstilbene |
| NOVM-53 | 4'-methylthio-4-(6-cryloyloxyhexyl)sulfonylstilbene |
| NOVM-54 | 4'-methylthio-4-(6-methacryloyloxyhexyl)sulfonylstilbene |
| NOVM-55 | 4'-(R-2-methylbutylthio)-4-(6-acryloyloxyhexyl)sulfonylstilbene |
| NOVM-56 | 4'-(R-2-methylbutylthio)-4-(6-methacryloyloxyhexyl)sulfonylstilbene |
| NOVM-57 | 4'-[N-(2-acryloyloxyethyl)-N-methylamino]-4-methylsulfonylazobenzene |
| NOVM-58 | 4'-[N-(2-methacryloyloxyethyl)-N-methylamino]-4-methylsulfonylazobenzene |
| NOVM-59 | 4'[N-(6-acryloyloxyhexyl)-N-methylamino]-4-methylsulfonylazobenzene |
| NOVM-60 | 4'[N-(6-methacryloyloxyhexyl)-N-methylamino]-4-methylsulfonylazobenzene |
| NOVM-61 | 4'-[4-acryloyloxy-1-piperidyl]-4-methylsulfonylazobenzene |
| NOVM-62 | 4'-[4-methacryloyloxy-1-piperidyl]-4-methylsulfonylazobenzene |
| NOVM-63 | 4'-[N-(2-acryloyloxyethyl)-N-methylamino]-4-phenylsulfonylazobenzene |
| NOVM-64 | 4'-[N-(2-methacryloyloxyethyl)-N-methylamino]-4-phenylsulfonylazobenzene |
| NOVM-65 | 4'-[N-(6-acryloyloxyhexyl)-N-methylamino]-4-phenylsulfonylazobenzene |
| NOVM-66 | 4'-[N-(6-methacryloyloxyhexyl)-N-methylamino]-4-phenylsulfonylazobenzene |
| NOVM-67 | 4'-[4-acryloyloxy-1-piperidyl]-4-phenylsulfonylazobenzene |
| NOVM-68 | 4'-[4-methacryloyloxy-1-piperidyl]-4-phenylsulfonylazobenzene |
| NOVM-69 | 4'-[N-(2-acryloyloxyethyl)-N-methylamino]-4-(R-2-methylbutyl)sulfonylazobenzene |
| NOVM-70 | 4'-[N-(2-methacryloyloxyethyl)-N-methylamino]-4-(R-2-methylbutyl)sulfonylazobenzene |
| NOVM-71 | 4'-[N-(6-acryloyloxyhexyl)-N-methylamino]- |

TABLE V-continued

| | |
|---|---|
| | 4-(R-2-methylbutyl)sulfonylazobenzene |
| NOVM-72 | 4'-[N-(6-methacryloyloxyhexyl)-N-methyl-amino]-4-(R-2-methylbutyl)sulfonylazobenzene |
| NOVM-73 | 4'-[4-acryloyloxy-1-piperidyl]-4-(R-2-methyl-butyl)sulfonylazobenzene |
| NOVM-74 | 4'-[4-methacryloyloxy-1-piperidyl]-4-(R-2-methylbutyl)sulfonylazobenzene |
| NOVM-75 | 4'-(2-acryloyloxyethoxy)-4-methylsulfonyl-azobenzene |
| NOVM-76 | 4'-(2-methacryloyloxyethoxy)-4-methylsulfon-ylazobenzene |
| NOVM-77 | 4'-(6-acryloyloxyhexoxy)-4-methylsulfonyl-azobenzene |
| NOVM-78 | 4'-(6-methacryloyloxyhexoxy)-4-methylsul-fonylazobenzene |
| NOVM-79 | 4'-(2-acryloyloxyethoxy)-4-phenylsulfonyl-azobenzene |
| NOVM-80 | 4'-(2-methacryloyloxyethoxy)-4-phenylsul-fonylazobenzene |
| NOVM-81 | 4'-(6-acryloyloxyhexoxy)-4-phenylsulfonyl-azobenzene |
| NOVM-82 | 4'-(6-methacryloyloxyhexoxy)-4-phenylsul-fonylazobenzene |
| NOVM-83 | 4'-(2-acryloyloxyethoxy)-4-(R-2-methylbutyl)-sulfonylazobenzene |
| NOVM-84 | 4'-(2-methacryloyloxyethoxy)-4-(R-2-methyl-butyl)sulfonylazobenzene |
| NOVM 85 | 4'-(6-acryloyloxyhexoxy)-4-(R-2-methyl-butyl)sulfonylazobenzene |
| NOVM-86 | 4'-(6-methacryloyloxyhexoxy)-4-(R-2-methyl-butyl)sulfonylazobenzene |
| NOVM-87 | 4'-(2-acryloyloxyethylthio)-4-methylsulfonyl-azobenzene |
| NOVM-88 | 4'-(2-methacryloyloxyethylthio)-4-methyl-sulfonylazobenzene |
| NOVM-89 | 4'-(6-acryloyloxyhexylthio)-4-methylsulfonyl-azobenzene |
| NOVM-90 | 4'-(6-methacryloyloxyhexylthio)-4-methylsul-fonylazobenzene |
| NOVM-91 | 4'(2-acryloyloxyethylthio)-4-phenylsulfonyl-azobenzene |
| NOVM-92 | 4'(2-methacryloyloxyethylthio)-4-phenylsul-fonylazobenzene |
| NOVM-93 | 4'-(6-acryloyloxyhexylthio)-4-phenylsulfonyl-azobenzene |
| NOVM-94 | 4'-(6-methacryloyloxyhexylthio)-4-phenylsul-fonylazobenzene |
| NOVM-95 | 4'(2-acryloyloxyethylthio)-4-(R-2-methyl-butyl)sulfonylazobenzene |
| NOVM-96 | 4'(2-methacryloyloxyethylthio)-4-(R-2-methyl-butyl)sulfonylazobenzene |
| NOVM-97 | 4'-(6-acryloyloxyhexylthio)-4-(R-2-methyl-butyl)sulfonylazobenzene |
| NOVM-98 | 4'-(6-methacryloyloxyhexylthio)-4-(R-2-methylbutyl)sulfonylazobenzene |
| NOVM-99 | 4'-dimethylamino-4-(2-acryloyloxyethyl)sul-fonylazobenzene |
| NOVM-100 | 4'-dimethylamino-4-(2-methacryloyloxyethyl)-sulfonylazobenzene |
| NOVM-101 | 4'-dimethylamino-4-(6-acryloyloxyhexyl)sul-fonylazobenzene |
| NOVM-102 | 4'-dimethylamino-4-(6-methacryloyloxyhexyl)-sulfonylazobenzene |
| NOVM-103 | 4'-(1-pyrrolidino)-4-(2-acryloyloxyethyl)-sulfonylazobenzene |
| NOVM-104 | 4'-(1-pyrrolidino)-4-(2-methacryloyloxy-ethyl)sulfonylazobenzene |
| NOVM-105 | 4'-(1-pyrrolidino)-4-(6-acryloyloxyhexyl)-sulfonylazobenzene |
| NOVM-106 | 4'-(1-pyrrolidino)-4-(6-methacryloyloxy-hexyl)sulfonylazobenzene |
| NOVM-107 | 4'-dimethylamino-4-(6-acryloyloxyhexyl)-sulfonylazobenzene |
| NOVM-108 | 4'-dimethylamino-4-(6-methacryloyloxyhexyl)-sulfonylazobenzene |
| NOVM-109 | 4'-(1-pyrrolidino-4-(6-acryloyloxyhexyl)-sulfonylazobenzene |
| NOVM-110 | 4'-(1-pyrrolidino-4-(6-methacryloyloxyhexyl)-sulfonylazobenzene |
| NOVM-111 | 4'[N-(R-2-methylbutyl)-N-methylamino]-4-(6-acryloyloxyhexyl)sulfonylazobenzene |
| NOVM-112 | 4'[N-(R-2-methylbutyl)-N-methylamino]-4-(6- |

TABLE V-continued

| | |
|---|---|
| | methacryloyloxyhexyl)sulfonylazobenzene |
| NOVM-113 | 4'-methoxy-4-(6-acryloyloxyhexyl)sulfonyl-azobenzene |
| NOVM-114 | 4'-methoxy-4-(6-methacryloyloxyhexyl)sul-fonylazobenzene |
| NOVM-115 | 4'-(R-2-methylbutoxy)-4-(6-acryloxyhexyl)-sulfonylazobenzene |
| NOVM-116 | 4'-(R-2-methylbutoxy)-4-(6-methacryloxy-hexyl)sulfonylazobenzene |
| NOVM-117 | 4'-methylthio-4-(6-acryloxyhexyl)sulfonyl-azobenzene |
| NOVM-118 | 4'-methylthio-4-(6-methacryloxyhexyl)sul-fonylazobenzene |
| NOVM-119 | 4'-(R-2-methylbutylthio)-4-(6-acryloxyhexyl)-sulfonylazobenzene |
| NOVM-120 | 4'-(R-2-methylbutylthio)-4-(6-acryloxy-hexyl)sulfonylazobenzene |
| NOVM-121 | 1-(9-julolidinyl)-2-[4-(6-acryloyloxyhexylsul-fonyl)phenyl]ethene |
| NOVM-122 | 1-(1-butyl-5-indolinyl)-2-[4-(6-methacryloyl-oxyhexylsulfonyl)phenyl]diimine |

The following are illustrative of typical vinyl addition monomers that can be copolymerized with the vinyl molecular dipole monomers of Table V, if desired. The vinyl molecular dipole monomers can form 50 to 100 percent of the repeating units of the polymer, with vinyl addition monomers, such as those of Table VI, below, forming the balance of the repeating units of the polymer.

TABLE VI

| | |
|---|---|
| VCOM-1 | Methyl acrylate |
| VCOM-2 | Ethyl acrylate |
| VCOM-3 | Butyl acrylate |
| VCOM-4 | t-Butyl acrylate |
| VCOM-5 | Methyl chloroacrylate |
| VCOM-6 | Methyl methacrylate |
| VCOM-7 | Ethyl methacrylate |
| VCOM-8 | Butyl methacrylate |
| VCOM-9 | t-Butylmethacrylate |
| VCOM-10 | Styrene |
| VCOM-11 | 4-Methylstyrene |
| VCOM-12 | α-Methylstyrene |
| VCOM-13 | 4-t-Butylstyrene |
| VCOM-14 | 4-Hydroxystyrene |
| VCOM-15 | 4-Methoxystyrene |
| VCOM-16 | 4-Acetoxystyrene |
| VCOM-17 | 2-Vinylnaphthylene |
| VCOM-18 | Acrylonitrile |
| VCOM-19 | Acrylamide |
| VCOM-20 | N-Phenylmaleimide |
| VCOM-21 | N-Vinylpyrrolidone |
| VCOM-22 | Vinylacetate |
| VCOM-23 | Vinylchloride |
| VCOM-24 | Butadiene |
| VCOM-25 | Isoprene |
| VCOM-26 | Chloroprene |

Conventional details of device fabrication are taught by the foregoing NLO citations.

The reflective metal layer 105 and the electrode 109 can be formed of any metal or combination of metals conventionally employed to form these layers. Generally metals having at least a moderate (at least 3.5 electron volts) work function are employed.

When the reflective metal layer is a relatively noble metal, preferably a metal having at work function of at least 4.5 electron volts (eV), the high $\chi^{(2)}$ polymer film can be formed on this layer by any convenient conventional technique, including Langmuir Blodgett assembly, self assembled monolayer construction techniques, and polymer poling. Reflective noble metal layers are particularly suited to use when higher than ambient poling temperatures are employed. For example, it is typical to choose polymeric layers for poling that exhibit a glass transition temperature of at least 50° C. (preferably at least 80° C.). By employing a reflective metal layer having a work function of at least 4.5 eV, it is possible to pole the polymeric layer at a temperature above its glass transition temperature while in direct contact with the reflective metal layer. Illustrative of metals having work functions of at least 4.5 eV are tungsten, rhenium, osmium, iridium, platinum, and gold. Of these metals, gold is a particularly preferred metal.

When the reflective metal layer is a moderate (3.5 to 4.5 eV) work function metal any of the above high $\chi^{(2)}$ polymeric film construction techniques can still be employed. However, if the high $\chi^{(2)}$ polymeric film is formed directly on the reflective metal layer, it is preferred to avoid heating to temperatures above 50° C. Further, any solvents associated with the polymeric film during deposition are preferably chosen to exhibit little, if any, capability of oxidizing the moderate work function metal. For example, Langmuir Blodgett and self assembly techniques are most compatible with forming a high $\chi^{(2)}$ polymeric film directly over a moderate work reflective metal layer. Poled polymeric films which rely on crosslinking at or near ambient temperatures to preserve alignment of organic molecular dipoles are also contemplated to be located directly on a moderate work function reflective metal layer.

When a moderate work function reflective metal is employed in combination of poled polymeric film having a glass transition temperature of at least 50° C., it is preferred to interpose a thin (>0.1 $\mu$m) protective layer between the reflective metal layer and the polymeric film. With the protective layer present, modulation of the optical articles of the invention is still achieved as described above. When the protective layer is deposited prior to the polymeric film or its reactive precursors, the metal reflective layer is fully protected. Observable levels of protection are realized when the protective layer exhibits thicknesses as low as 10 Å however, it is generally preferred for the protective layer to exhibit thicknesses in the range of from 100 to 700 Å. Any one or combination of the category (a) metal oxides and fluorides described above can be employed to form the protective layer. The protective layers are the specific subject matter of Rider et al, cited above.

EXAMPLES

The following examples illustrate preferred embodiments of the invention.

Prisms and other glass substrates employed as supports included a pitch polished deposition surface that was cleaned in successive stages using detergent, deionized water, iso-propyl alcohol, and a high-purity toluene vapor reflux.

A mixture of MgF$_2$ (R.I. 1.387) and TEL-22 (R.I. 1.67) was co evaporated onto a flint glass (R.I. 1.712) prism surface in a vacuum chamber in a weight ratio of 31:69 to a thickness of 715 nm. This yielded a first dielectric layer having a refractive index of 1.553. The pressure in the vacuum chamber during deposition was below $10^{-5}$ Torr.. The rate of deposition of TEL-22 was between 6 and 7 Å/sec., and the rate of deposition of MgF$_2$ was between 3 and 3.5 Å/sec.

To facilitate thickness and refractive index measurements a test deposition was made prior to the deposition reported above onto a control glass substrate having a refractive index (R.I. 1.457) lower than that of the first dielectric layer. Also, to assist in determining the exact ratio of TEL to MgF$_2$ coated onto the prism surface, separate control glass substrates were placed on either side of the prism during deposition.

After the thickness and refractive index of the first dielectric layer on the prism surface was determined, an optimum aim thickness for a reflective silver layer was calculated to be 237 Å. Silver deposition was then undertaken at 4 Å/sec., again placing two controls on opposite sides of the prism to assist is in accurate determination of layer thickness.

A protective layer was next formed on the reflective silver layer. A 50 Å layer of MgF$_2$ was evaporated at a pressure of less than $10^{-5}$ Torr. at a rate of 2 Å/sec.

To form the second dielectric layer a 15% by weight solution of a linear vinyl polymer (R.I. 1.563, T$_g$ 123° C.) containing organic molecular dipole repeating units comprised of an amino electron donor moiety and a methylsulfonyl electron acceptor moiety linked through a 4,4'-stilbene conjugated $\pi$ bonding system dissolved in doubly distilled trichloropropane was prepared. The solution was applied to the device through a 0.2 $\mu$m filter till the silver layer was entirely covered. The sample was then spun for 10 seconds at 500 rpm after which it was accelerated to 1000 rpm for a further 60 seconds.

The sample was immediately placed in a vacuum oven and baked to evaporate the solvent. The temperature was increased over a period of 2 hours to 95° C. at a reduced pressure of $1\times10^{-3}$ Torr. After 16 hours heating was discontinued the sample was allowed to cool over a period of 3 hours before it was removed from the oven.

By comparing sample reflectance as a function of angle of incident electromagnetic radiation against a calculated model it was determined that the second dielectric layer exhibited a thickness of 1.98 $\mu$m and a refractive index of 1.566.

A gold electrode was next formed over the second dielectric layer, but limited in area so that it did not overlie a portion of the silver layer. Gold in the amount 395 Å was deposited at 5 Å/sec. to form an electrode on the surface of the device. To permit electrical contact to the silver layer for poling, a small area of the second dielectric layer which did not receive gold was removed by swabbing with dichloromethane to expose the underlying silver layer. Phosphor bronze contacts were attached to the exposed reflective silver layer and to the gold electrode using a conductive silver paste.

The polymeric second dielectric layer was poled by heating the sample to 95° C. over hours and then applying to the silver and gold layers through the contacts 150 volts for 2.5 hours. With the voltage still applied, the device was allowed to cool to room temperature over a period of 2 hours. The applied voltage was then removed.

When the completed device was addressed with p-polarized light from a helium neon laser (==632 nm). it was observed to modulate light in the long range surface plasmon mode and in a total of 7 guided modes. FIG. 3, which is a plot of the angle of incidence $\Theta$ over the range of from 64° to 72° shows a reduction of reflectance to 25 percent at C, which corresponds to the long range surface plasmon mode of operation. A a slightly higher minimum reflectance is shown at point D, corresponding to operation in the zero order guided mode. While minimum reflection was somewhat higher in the guided mode, the slope of reflectance curve adjacent the guided mode minimum was steeper than that of obtained in the long range surface plasmon mode of operation.

A sinusoidally oscillating voltage with an amplitude of Vo and a frequency of 1 KHz was applied across the second dielectric layer through the reflective silver layer and the gold electrode, causing a time varying change in the refractive index of the of the high $\chi^{(2)}$ polymeric layer. A small positive change in refractive index of the polymeric layer causes the curve shown in FIG. 3 to shirt in the direction of higher values of $\Theta$, changing the reflectance of the device at any selected value of $\Theta$. The modulation of the reflected laser beam, M as the amplitude of the reflectance change divided by the average reflectance, was measured with the following results:

TABLE VII

| Operation Mode | Vo | M |
|---|---|---|
| Long Range Surface Plasmon | 141 | 0.021 |
| Zero Order Guided Mode | 117 | 0.23 |

The invention has been described in detail with particular reference to preferred embodiments thereof, but it will be understood that variations and modifications can be effected within the spirit and scope of the invention.

What is claimed is:

1. An optical article capable of modulating the reflection of electromagnetic radiation comprising
   a reflective metal layer having a thickness of less than 0.5 μm,
   means for directing polarized electromagnetic radiation to said reflective metal layer,
   a first dielectric medium interposed between said reflective metal layer and said means for directing the electromagnetic radiation having a thickness in the ranging from 0.1 to 10 times the wavelength of the electromagnetic radiation,
   a second dieelectric medium adjacent said reflective metal layer exhibiting a refractive index which differs from that of said first dielectric medium by less than 20 percent and can be adjusted by an applied electrical potential gradient, and
   means for variably applying an electrical potential to a surface of said second dielectric medium remote from said reflective metal layer, characterized in that
   said means for directing the electromagnetic radiation constitutes a support,
   said first dielectric medium is a first dielectric layer coated on said support comprised of at least one metal oxide, metal fluoride, or low molecular weight aromatic compound,
   said reflective metal layer is coated on said first electric layer, and
   said second dielectric medium is a polymeric layer ed on said reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety.

2. An optical article according to claim 1 further characterized in that said second dielectric medium is a poled polymeric layer having a glass transition temperature of at least 50° C.

3. An optical article according to claim 2 further characterized in that said second dielectric medium exhibits a refractive index greater than that of said first dielectric medium.

4. An optical article according to claim 1 further characterized in that said polymeric layer is comprised of a linear polymer containing organic molecular dipoles within its repeating units.

5. An optical article according to claim 1 further characterized in that said first dielectric later is comprised of a metal oxide.

6. An optical article according to claim 5 further characterized in that said metal oxide is chosen from the group consisting of rare earth oxides, alkaline earth oxides, alumina, and silica.

7. An optical article according to claim 1 further characterized in that said first dielectric layer is comprised of a metal fluoride.

8. An optical article according to claim 7 further characterized in that said metal fluoride is chosen from the group consisting of alkali metal fluorides, alkaline earth fluorides, and rare earth flourides.

9. An optical article according to claim 7 further characterized in that said metal fluoride is an alkali metal fluoride.

10. An optical article according to claim 9 further characterized in that said alkali metal fluoride is lithium fluoride.

11. An optical article according to claim 7 further characterized in that said metal fluoride is an alkaline earth fluoride.

12. An optical article according to claim 11 further characterized in that said alkaline earth fluoride is magnesium fluoride.

13. An optical article according to claim 1 further characterized in that said first dielectric layer is comprised of a low molecular weight aromatic compound.

14. An optical device according to claim 13, further characterized in that said aromatic compound is a phenylindan compound of the structure:

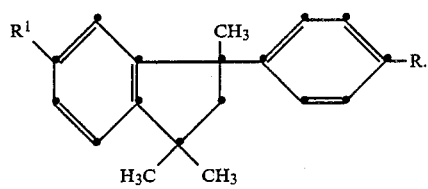

wherein R and $R^1$ are independently selected from the group consisting of nitro, amino, carboxyl, formamido groups, carbamoyl groups and heterocyclic groups derived from amino or carboxyl groups.

15. An optical device according to claim 13, further characterized in that said aromatic compound is a phthalimide compound of the structure:

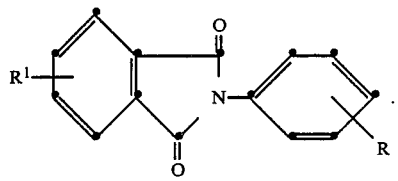

wherein R and $R^1$ are independently selected from the group consisting of nitro, amino, carboxyl, formamido groups, carbamoyl groups and heterocyclic groups derived from amino or carboxyl groups.

16. An optical article according to claim 1 further characterized in that said reflective metal layer has a thickness in the range of from 50 to 500Å.

17. An optical article according to claim 16 further characterized in that said reflective metal layer has a thickness in the range of from 100 to 300Å.

18. An optical article according to claim 1 further characterized in that said reflective metal layer is a noble metal layer.

19. An optical article according to claim 18 further characterized in that said noble metal layer is gold.

20. An optical article according to claim 1 further characterized in that said reflective metal layer has a work function in the range of from 3.5 to 4.5 eV.

21. An optical article according to claim 20 further characterized in that said metal is chosen from the group consisting of magnesium, indium, titanium, aluminum, nickel, cobalt, zinc, silver, tin, antimony, bismuth, and mixtures thereof.

22. An optical article according to claim 21 further characterized in that said metal is silver.

23. An optical article according to claim 1 further characterized in that said means for directing electromagnetic radiation is a prism.

24. An optical article according to claim 1 further characterized in that said means for directing electromagnetic radiation is a waveguide.

25. An optical article according to claim 24 further characterized in that said waveguide is an optical fiber comprised of a core of a first refractive index and a surrounding cladding layer of a lower refractive index and said metal layer is optically coupled to said core.

26. An optical article according to claim 25 further characterized in that said optical fiber is partially embedded in a dielectric mounting block presenting a planar surface, a portion of said optical fiber form a portion of said planar surface, and said metal layer lies in contact with said portions of said planar surface formed by said mounting block and said optical fiber.

* * * * *